(12) United States Patent
Kim et al.

(10) Patent No.: US 11,226,695 B2
(45) Date of Patent: Jan. 18, 2022

(54) DISPLAY DEVICE

(71) Applicant: LG Display Co., Ltd., Seoul (KR)

(72) Inventors: Keun-Young Kim, Seoul (KR);
Byong-Hoo Kim, Paju-si (KR);
Young-Sub Shin, Goyang-si (KR);
Sung-Jin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/709,071

(22) Filed: Dec. 10, 2019

(65) Prior Publication Data

US 2020/0210005 A1 Jul. 2, 2020

(30) Foreign Application Priority Data

Dec. 27, 2018 (KR) .................. 10-2018-0170539

(51) Int. Cl.
*G06F 3/041* (2006.01)

(52) U.S. Cl.
CPC .. *G06F 3/0412* (2013.01); *G06F 2203/04112* (2013.01)

(58) Field of Classification Search
CPC .............. G06F 3/0412; G06F 2203/04112
See application file for complete search history.

(56) References Cited

U.S. PATENT DOCUMENTS

| | | | |
|---|---|---|---|
| 2017/0154704 A1* | 6/2017 | Kanna | C09D 131/04 |
| 2017/0358637 A1* | 12/2017 | Lee | H01L 27/3262 |
| 2019/0043927 A1* | 2/2019 | Jang | H01L 27/323 |
| 2019/0220649 A1* | 7/2019 | Zhu | G06K 9/00087 |
| 2019/0302959 A1* | 10/2019 | Clark | G06F 3/0412 |
| 2020/0075880 A1* | 3/2020 | Wen | H01L 27/3283 |
| 2020/0105840 A1* | 4/2020 | Choi | H01L 51/5253 |
| 2020/0119113 A1* | 4/2020 | Lee | H01L 51/5012 |
| 2020/0159350 A1* | 5/2020 | Yang | G06F 3/0448 |
| 2020/0161398 A1* | 5/2020 | Bang | H01L 27/3279 |
| 2020/0278582 A1* | 9/2020 | Shimizu | G02F 1/133603 |

FOREIGN PATENT DOCUMENTS

| | | | | |
|---|---|---|---|---|
| JP | 2003270624 | * | 9/2003 | G02B 5/02 |
| KR | 20160047035 | * | 5/2016 | C09J 7/10 |

OTHER PUBLICATIONS

English Translation of Chinese Publication 201796947 (Year: 2017).*
English Translation of JP 2003270624 (Year: 2003).*

* cited by examiner

*Primary Examiner* — Patrick N Edouard
*Assistant Examiner* — Eboni N Giles
(74) *Attorney, Agent, or Firm* — Fenwick & West LLP

(57) ABSTRACT

Disclosed is a display device capable of reducing the reflection of external light. The display device includes an optical adhesive layer disposed between an element substrate, on which a light-emitting element and a touch sensor are disposed, and a cover substrate, wherein the optical adhesive layer includes a first lower adhesive layer disposed so as to overlap an emission area, in which the light-emitting element is disposed, and a second lower adhesive layer formed so as to have a shape different from the shape of the first lower adhesive layer, the second lower adhesive layer being disposed so as to overlap a non-emission area, excluding the emission area, whereby it is possible to improve optical efficiency while reducing the reflection of external light.

15 Claims, 7 Drawing Sheets

DISPLAY DEVICE

CROSS-REFERENCE TO RELATED APPLICATIONS

This application claims the benefit of Republic of Korea Patent Application No. 10-2018-0170539, filed on Dec. 27, 2018, which is hereby incorporated by reference in its entirety.

BACKGROUND

Field of Technology

The present disclosure relates to a display device, and more particularly to a display device capable of preventing the reflection of external light.

Discussion of the Related Art

Image display devices, which are a core technology in the information and communication age and serve to display various kinds of information on a screen, have been developed such that the image display devices are thin, light, and portable and exhibit high performance. As a result, flat panel display devices, which have lower weight and volume than cathode ray tubes (CRT), have received a great deal of attention.

Representative examples of such flat panel display devices may include a liquid crystal display (LCD) device, a plasma display panel (PDP) device, an organic light-emitting display (OLED) device, and an electrophoretic display (ED) device.

A flat panel display device includes a plurality of signal lines and a plurality of driving electrodes. External light is reflected by the signal lines and the driving electrodes, whereby external visibility is reduced.

In the case in which a polarizing plate is used to solve this problem, it is possible to reduce the reflection of external light. However, transmittance is reduced and price competitiveness is deteriorated due to the polarizing plate, which is expensive.

SUMMARY

Accordingly, the present disclosure is directed to a display device that substantially obviates one or more problems due to limitations and disadvantages of the related art.

An object of the present disclosure is to provide a display device capable of preventing the reflection of external light.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a display device includes an optical adhesive layer disposed between an element substrate, on which a light-emitting element and a touch sensor are disposed, and a cover substrate, wherein the optical adhesive layer includes a first lower adhesive layer disposed so as to overlap an emission area, in which the light-emitting element is disposed, and a second lower adhesive layer formed so as to have a shape different from the shape of the first lower adhesive layer, the second lower adhesive layer being disposed so as to overlap a non-emission area, but not the emission area, whereby it is possible to improve optical efficiency while preventing the reflection of external light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the disclosure and together with the description serve to explain the principle of the invention. In the drawings.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
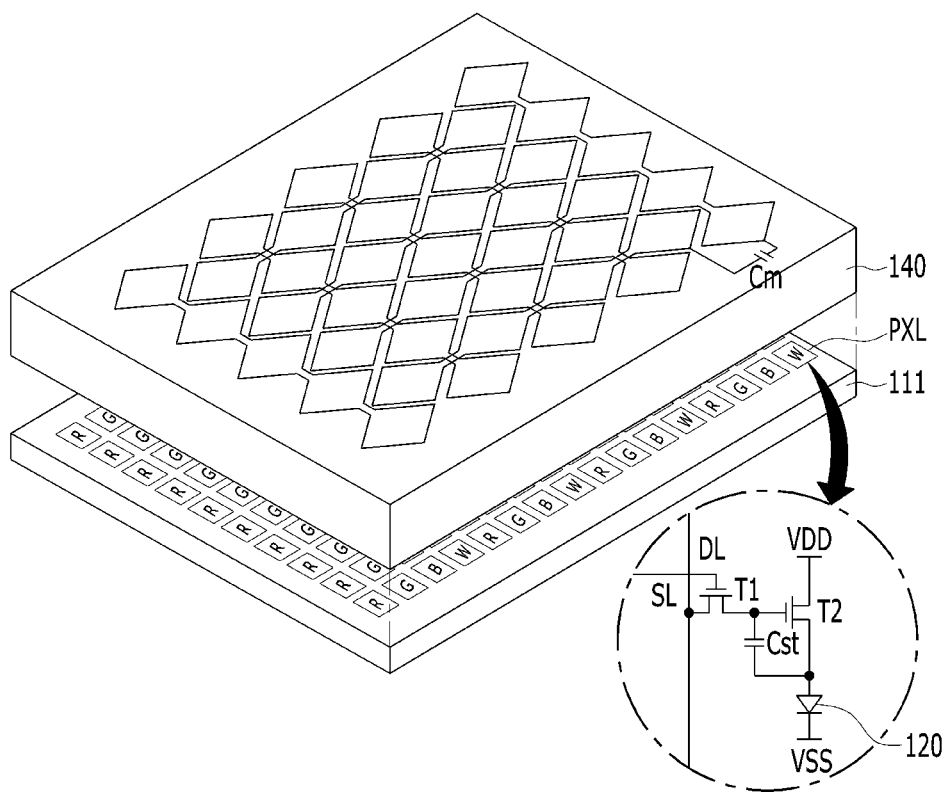
FIG. 1 is a perspective view showing an organic light-emitting display device having a touch sensor according to one embodiment of the present disclosure.
Figure 2:
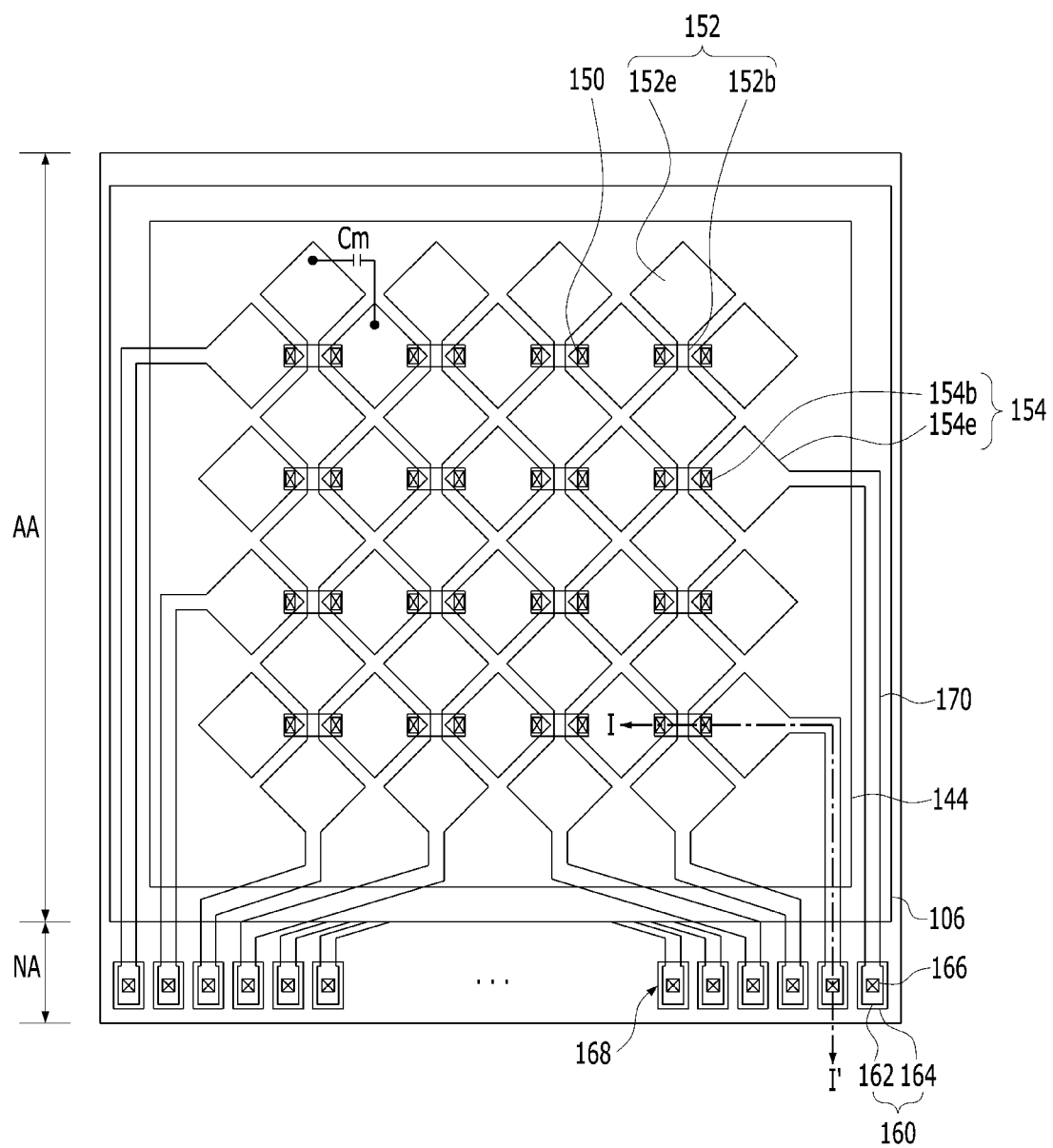
FIG. 2 is a plan view of the organic light-emitting display device having the touch sensor shown in FIG. 1 according to one embodiment of the present disclosure.

FIG. 1 is a perspective view showing an organic light-emitting display device having a touch sensor according to the present disclosure, and FIG. 2 is a plan view of the organic light-emitting display device having the touch sensor according to the present disclosure.

The organic light-emitting display device having the touch sensor shown in FIGS. 1 and 2 includes a plurality of subpixels PXL arranged on an element substrate 111 in a matrix fashion, an encapsulation unit 140 disposed on the subpixels PXL, and mutual capacitance Cm of the touch sensor disposed on the encapsulation unit 140.

The organic light-emitting display device having the touch sensor displays an image through the subpixels PXL, each of which includes a light-emitting element 120, during a display period. In addition, the organic light-emitting display device having the touch sensor detects variation in mutual capacitance Cm (the touch sensor) due to a user's touch during a touch period to sense whether a touch has been performed and the touched position.

Each of the subpixels PXL, which are disposed in an active area of the organic light-emitting display device having the touch sensor, includes a pixel-driving circuit and a light-emitting element 120 connected to the pixel-driving circuit.

As shown in FIG. 1, the pixel-driving circuit includes a switching transistor T1, a driving transistor T2, and a storage capacitor Cst. Meanwhile, in the present disclosure, the pixel-driving circuit has been described as including two transistors T and one capacitor C by way of example. However, the present disclosure is not limited thereto. That is, a 3T1C or 3T2C type pixel-driving circuit having three or more transistors T and one or more capacitors C may be used.

When a scan pulse is supplied to a scan line SL, the switching transistor T1 is turned on to supply a data signal, which is supplied to a data line DL, to the storage capacitor Cst and to a gate electrode of the driving transistor T2.

In response to the data signal supplied to the gate electrode of the driving transistor T2, the driving transistor T2 controls the current that is supplied from a high-voltage (VDD) supply line to the light-emitting element 120 to adjust the amount of light emitted by the light-emitting element 120. Even when the switching transistor T1 is turned off, the driving transistor T2 supplies uniform current to the light-emitting element 120 using the voltage charged in the storage capacitor Cst such that the light-emitting element 120 keeps emitting light until a data signal of the next frame is supplied.

Figure 3:
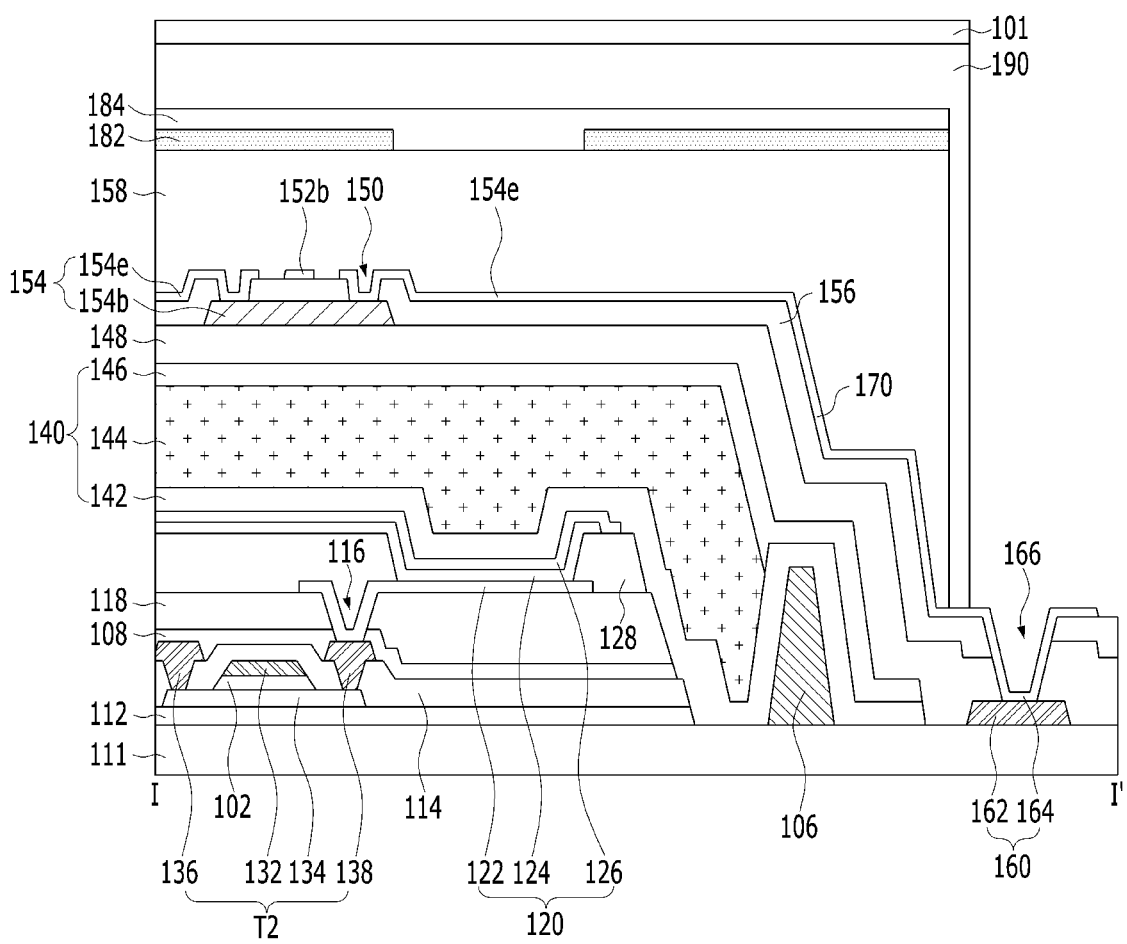
FIG. 3 is a sectional view of the organic light-emitting display device taken along line I-I' of FIG. 2 according to one embodiment of the present disclosure.

To this end, as shown in FIG. 3, the driving transistor T2 includes a semiconductor layer 134 disposed on a buffer layer 112, a gate electrode 132 overlapping the semiconductor layer 134 in the state in which a gate dielectric film 102 is disposed therebetween, and source electrode 136 and drain electrode 138 formed on an interlayer dielectric film 114 so as to contact the semiconductor layer 134.

The semiconductor layer 134 is made of at least one of an amorphous semiconductor material, a polycrystalline semiconductor material, or an oxide semiconductor material. The semiconductor layer 134 includes a channel area, a source area, and a drain area. The channel area overlaps the gate electrode 132 in the state in which the gate dielectric film 102 is disposed therebetween to be formed between the source and drain electrodes 136 and 138. The source area is electrically connected to the source electrode 136 via a source contact hole, which is formed through the interlayer dielectric film 114. The drain area is electrically connected to the drain electrode 138 via a drain contact hole, which is formed through the interlayer dielectric film 114.

The gate electrode 132 may be made of one of molybdenum (Mo), aluminum (Al), chrome (Cr), gold (Au), titanium (Ti), nickel (Ni), neodymium (Nd), or copper (Cu) or an alloy thereof, and may have a single-layered structure or a multi-layered structure. However, the present invention is not limited thereto.

The gate electrode 132 overlaps the channel area of the semiconductor layer 134 in the state in which the gate dielectric film 102 is disposed therebetween. As shown in FIG. 3, the gate dielectric film 102 may be formed so as to have the same line width as the gate electrode 132 in order to expose the side surface of the semiconductor layer 134, or may be formed so as to have a larger line width than the gate electrode 132 in order to cover the side surface of the semiconductor layer 134.

Each of the source and drain electrodes 136 and 138 may be made of one of molybdenum (Mo), aluminum (Al), chrome (Cr), gold (Au), titanium (Ti), nickel (Ni), neodymium (Nd), or copper (Cu) or an alloy thereof, and may have a single-layered structure or a multi-layered structure. However, the present disclosure is not limited thereto. The source electrode 136 is connected to the source area of the semiconductor layer 134, which is exposed through the source contact hole formed through both the gate dielectric film 102 and the interlayer dielectric film 114 or only through the interlayer dielectric film 114. The drain electrode 138 faces the source electrode 136, and is connected to the drain area of the semiconductor layer 134 via the drain contact hole, which is formed through both the gate dielectric film 102 and the interlayer dielectric film 114 or only through the interlayer dielectric film 114.

The light-emitting element 120 includes an anode electrode 122, at least one light-emitting stack 124 formed on the anode electrode 122, and a cathode electrode 126 formed on the light-emitting stack 124.

The anode electrode 122 is electrically connected to the drain electrode 138 of the driving transistor T2, which is exposed through a pixel contact hole 116 formed through a passivation film 108 and a planarization layer 118 disposed on the driving transistor T2. The anode electrode 122 of each subpixel is formed to be exposed by a bank 128 disposed on the element substrate 111. The bank 128 is formed so as to expose the anode 132. The bank 138 may be made of an opaque material (e.g. black to reduce optical interference between neighboring subpixels. In this case, the bank 128 includes a light-blocking material made of at least one of a color pigment, organic black, or carbon.

The at least one light-emitting stack 124 is formed on the anode electrode 122 in a light-emitting area defined by the bank 128. The at least one light-emitting stack 124 is formed by stacking a hole-related layer, an organic light-emitting layer, and an electron-related layer on the anode electrode 122 in that order or in the reverse order. In addition, the light-emitting stack 124 may include first and second light-emitting stacks that are opposite each other in the state in which a charge generation layer is disposed therebetween. In this case, the organic light-emitting layer of one of the first and second light-emitting stacks generates blue light, and the organic light-emitting layer of the other of the first and second light-emitting stacks generates yellowish-green light. Consequently, white light is generated by the first and second light-emitting stacks. The white light generated by the light-emitting stack 124 is incident on a color filter, which is located above or under the light-emitting stack 124, to realize a color image. Alternatively, each light-emitting stack 124 may generate colored light corresponding to a respective subpixel without a separate color filter in order to realize a color image. That is, the light-emitting stack 124 of the red (R) subpixel may generate red light, the light-emitting stack 124 of the green (G) subpixel may generate green light, and the light-emitting stack 124 of the blue (B) subpixel may generate blue light.

The cathode electrode 126 is formed to be opposite the anode electrode 122 in the state in which the light-emitting stack 124 is disposed therebetween, and is connected to a low-voltage (VSS) supply line.

The encapsulation unit 140 reduces external moisture or oxygen from permeating into the light-emitting element 120, which has low resistance to external moisture or oxygen.

To this end, the encapsulation unit 140 includes a first inorganic encapsulation layer 142 and a second inorganic encapsulation layer 146 and at least one organic encapsulation layer 144. In the present disclosure, an encapsulation unit 140 having a structure in which a first inorganic encapsulation layer 142, an organic encapsulation layer 144, and a second inorganic encapsulation layer 146 are sequentially stacked will be described by way of example.

The first inorganic encapsulation layer 142 is formed on the element substrate 111, on which the cathode electrode 126 is formed. The second inorganic encapsulation layer 146 is formed on the element substrate 111, on which the organic encapsulation layer 144 is formed, and is formed to surround the upper surface, the lower surface, and the side surface of the organic encapsulation layer 144 together with the first inorganic encapsulation layer 142.

The first and second inorganic encapsulation layers 142 and 146 reduce or prevent external moisture or oxygen from permeating into the light-emitting stack 124. Each of the first and second inorganic encapsulation layers 142 and 146 is made of an inorganic dielectric material that can be deposited at a low temperature, such as silicon nitride ($SiN_x$), silicon oxide ($SiO_x$), silicon oxide nitride (SiON), or aluminum oxide ($Al_2O_3$). Consequently, each of the first and second inorganic encapsulation layers 142 and 146 is deposited in a low-temperature atmosphere, whereby it is possible to reduce damage to the light-emitting stack 124, which has low resistance to a high-temperature atmosphere, when each of the first and second inorganic encapsulation layers 142 and 146 is deposited.

The organic encapsulation layer 144 reduces stress between the layers due to bending of the organic light-emitting device and improves planarization. The organic encapsulation layer 144 is formed on the element substrate 111, on which the first inorganic encapsulation layer 142 is formed, and is made of a non-photosensitive organic dielectric material, such as a particle cover layer (PCL), an acrylic resin, an epoxy resin, polyimide, polyethylene, or silicon oxycarbide (SiOC), or a photosensitive organic dielectric material, such as photo acrylic. The organic encapsulation layer 144 is disposed in an active area AA, excluding a non-active area NA. A dam 106 is disposed on the element substrate 111 or the passivation film 108 in order to prevent the organic encapsulation layer 144 from spreading to the non-active area NA.

A touch-sensing line 154 and a touch-driving line 152 are disposed in the active area AA of the encapsulation unit 140 to intersect each other in the state in which a touch dielectric film 156 is disposed therebetween. Mutual capacitance Cm is formed at the intersection of the touch-sensing line 154 and the touch-driving line 152. Consequently, the mutual capacitance Cm charges an electric charge by a touch-driving pulse supplied to the touch-driving line 152 and discharges the charged electric charge to the touch-sensing line 154, thereby serving as a touch sensor.

The touch-driving line 152 includes a plurality of first touch electrodes 152e and first bridges 152b for electrically interconnecting the first touch electrodes 152e.

The first touch electrodes 152e are spaced apart from each other on the touch dielectric film 156 by a predetermined distance in a Y direction, which is a first direction. Each of the first touch electrodes 152e is electrically connected to an adjacent first touch electrode 152e via a corresponding one of the first bridges 152b.

The first bridges 152b are disposed on the touch dielectric film 156, which is disposed in the same plane as the first touch electrodes 152e, so as to be electrically connected to the first touch electrodes 152e without separate contact holes. The first bridges 152b are disposed to overlap the bank 128, whereby it is possible to reduce the reduction of an aperture ratio due to the first bridges 152b.

The touch-sensing line 154 includes a plurality of second touch electrodes 154e and second bridges 154b for electrically interconnecting the second touch electrodes 154e.

The second touch electrodes 154e are spaced apart from each other on the touch dielectric film 156 by a predetermined distance in an X direction, which is a second direction. Each of the second touch electrodes 154e is electrically connected to an adjacent second touch electrode 154e via a corresponding one of the second bridges 154b.

The second bridges 154b are formed on a touch buffer layer 148 disposed between the encapsulation unit 140 and the touch sensor, and are electrically connected to the second touch electrodes 154e via touch contact holes 150, which are formed through the touch dielectric film 156. In the same manner as the first bridges 152b, the second bridges 154b are disposed to overlap the bank 128, whereby it is possible to reduce the reduction of an aperture ratio due to the second bridges 154b.

Meanwhile, the structure in which the second bridges 154b are disposed on the touch buffer layer 148 so as to contact the touch buffer layer 148 has been described by way of example with reference to FIG. 3. Alternatively, at least one of the first and second touch electrodes 152e and 154e or the first bridges 152b may be disposed on the touch buffer layer 148 to contact the touch buffer layer 148, and the second bridges 154b may be disposed on the touch dielectric film 156.

Figure 4:
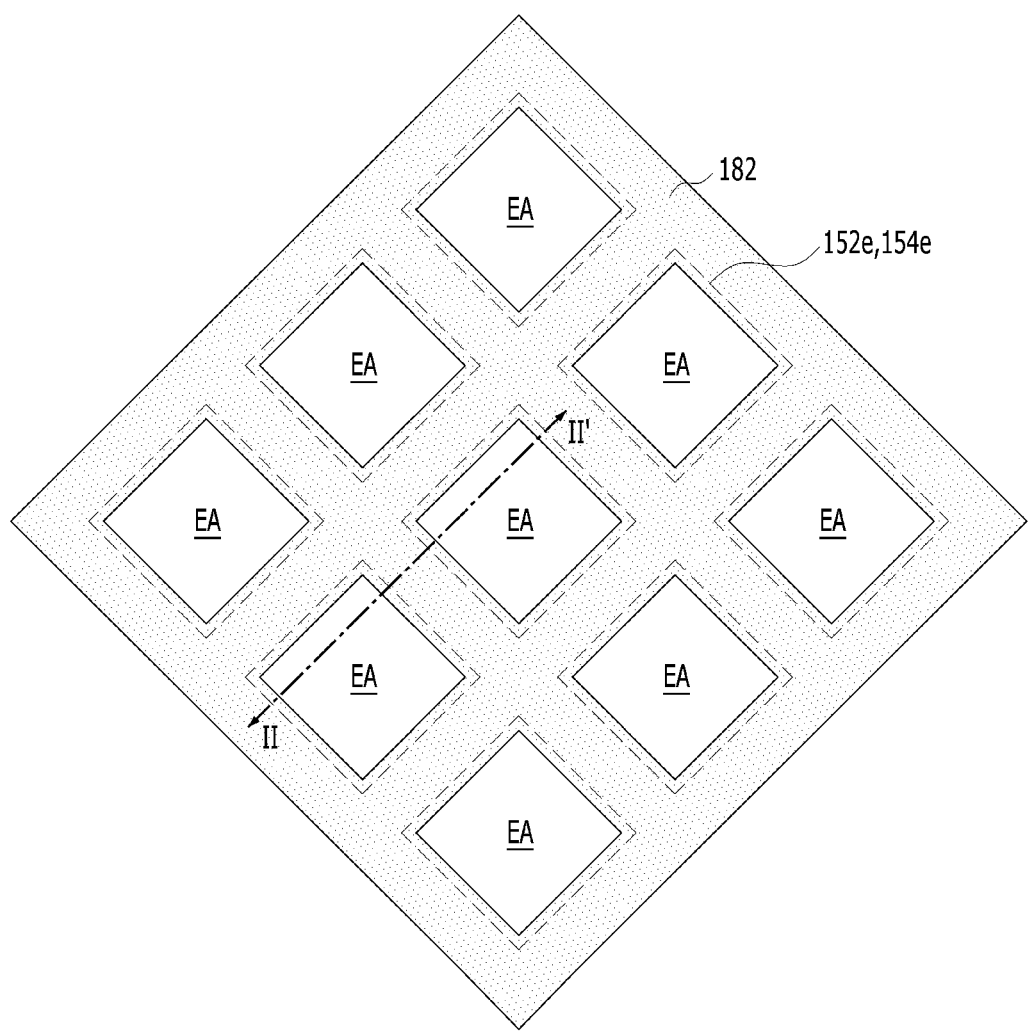
FIG. 4 is a detailed plan view showing the touch electrode shown in FIG. 2 according to one embodiment of the present disclosure.

In addition, each of the first bridges 152b, the second bridges 154b, the first touch electrodes 152e, and the second touch electrodes 154e has been described by way of example as being formed in a plate shape, as shown in FIG. 2. Alternatively, at least one of the first bridges 152b, the second bridges 154b, the first touch electrodes 152e, or the second touch electrodes 154e may be formed in a mesh shape. In the present invention, the structure in which the first touch electrodes 152e and the second touch electrodes 154e are formed in a mesh shape will be described by way of example with reference to FIGS. 4 and 5. The mesh-shaped touch electrodes 152e and 154e overlap at least one of the bank 128, an antireflective film 182, and a second lower adhesive layer 1922 disposed in a non-emission area NEA of each subpixel. The antireflective film 182 is formed by black material. An opening area between the mesh-shaped touch electrodes 152e and 154e corresponds to an emission area EA of each subpixel. Each of the touch electrodes 152e and 154e includes a transparent conductive film, such as ITO or IZO, and a mesh metal film disposed above or under the transparent conductive film, the mesh metal film being formed in a mesh shape. Alternatively, each of the touch electrodes 152e and 154e may include only a mesh metal film. Here, the mesh metal film has a structure having at least one layer made of at least one of Ti, Al, Mo, MoTi, Cu, Ta, or ITO, which exhibits higher conductivity than the transparent conductive film, and is formed in a mesh shape. For example, the mesh metal film is formed to have a three-layer stack structure, such as Ti/Al/Ti, MoTi/Cu/MoTi, or Ti/Al/Mo. Consequently, the resistance and capacitance of each of the first and second touch electrodes 152e and 154e and the first and second bridges 152b and 154b are reduced, whereby an RC time constant is reduced and thus touch sensitivity is improved. In addition, the line width of the mesh metal film of each of the first and second touch electrodes 152e and 154e is very small, whereby it is possible to reduce the reduction of an aperture ratio and transmittance due to the mesh metal film.

Meanwhile, a display pad 168, which is connected to at least one of the data line DL, the scan line SL, the low-voltage (VSS) supply line, or the high-voltage (VDD) supply line, and a touch pad 160 are disposed in the non-active area NA. The display pad 168 and the touch pad 160 may be disposed in the portion of the non-active area NA corresponding to at least one of a one-side portion or another-side portion of the element substrate 111, or may be disposed in different portions of the non-active area NA. Meanwhile, the disposition of the touch pad 160 and the display pad 168 is not limited to the structure shown in FIG. 2. The disposition of the touch pad 160 and the display pad 168 may be variously changed depending on the design of the display device.

The touch pad 160 and the display pad 168 are disposed on a dielectric film disposed under the light-emitting element 120. For example, the touch pad 160 is disposed on the element substrate 111 together with the display pad 168. The touch pad 160 and the display pad 168 are formed to be exposed by a first touch passivation film 158. Consequently, the touch pad 160 is connected to a signal transmission film having a touch-driving circuit (not shown) mounted thereon, and the display pad 168 is connected to a signal transmission film having at least one of a scan-driving unit or a data-driving unit mounted thereon. Meanwhile, the touch-driving circuit may be mounted in one of the data-driving unit and a timing controller.

The touch pad 160 includes first pad electrode 162 and second pad electrode 164, which are electrically connected to each other.

The first pad electrode 162 is made of the same material as the source and drain electrodes 136 and 138, and is disposed on the element substrate 111. Meanwhile, the first pad electrode 162 may be made of the same material as the source and drain electrodes 136 and 138, and may be disposed in the same plane as the source and drain electrodes 136 and 138.

The second pad electrode 164 is made of the same material as a routing line 170, and is disposed on the touch dielectric film 156. The second pad electrode 164 is connected to the first pad electrode 162, which is exposed through a pad contact hole 166 formed through the touch dielectric film 156 and the touch buffer layer 148. Meanwhile, the routing line 170, which is connected to the second pad electrode 164, extends from each of the touch electrodes 152e and 154e, and is formed along the side surface of the encapsulation unit 140. The routing line 170 is disposed so as to cross (overlap) at least one dam 106. The routing line 170 is made of the same material as the touch electrodes 152e and 154e, and is formed on the touch dielectric film 156. The routing line 170 overlaps the antireflective film 182, which is disposed on the first touch passivation film 158, so as to reduce external light from being reflected by the routing line 170. An edge portion of the touch buffer layer 148 is closer to the pad contact hole 166 than an edge portion of the inorganic encapsulation layers 142 and 146.

The first passivation film 158 and second touch passivation film 184 and the antireflective film 182 are disposed on the touch sensor, which includes the touch electrodes 152e and 154e and the bridges 152b and 154b.

The first and second touch passivation films 158 and 184 are formed to cover the touch sensor, which includes the touch electrodes 152e and 154e and the bridges 152b and 154b, in order to reduce the touch sensor from being corroded by external moisture. In addition, the second touch passivation film 184 is formed to cover the antireflective film 182 to planarize the substrate 111, on which the antireflective film 182 is formed. Each of the first and second touch passivation films 158 and 184 is made of an organic dielectric material, such as epoxy or acrylic, and is formed in the form of a thin film or a general film, or is made of an inorganic dielectric material, such as SiNx or SiOx.

The antireflective film 182 reduces mixing of internal light generated by the light-emitting element 120. In addition, the antireflective film 182 absorbs external light incident via an optical adhesive layer 190 from the outside, whereby it is possible to reduce the external light from being reflected by the light-emitting element 120, the touch sensor, and the routing line 170 and thus being visible. The optical adhesive layer 190 is disposed on the touch sensor. The encapsulation unit 140, the optical adhesive layer 190 and the touch buffer layer 148 extend from the active area to the non-active area. The inorganic encapsulation layers 142 and 146, the touch buffer layer 148, the routing line 170 and the optical adhesive layer 190 are disposed on the dam 106.

The antireflective film 182 is formed in a mesh (matrix) shape to overlap the mesh-shaped first and second touch electrodes 152e and 154e and the bank 128. That is, the antireflective film 182 is formed in the non-emission area NEA, but is not formed in the emission area EA. The antireflective film 182 includes black nanoparticles. The black nanoparticles include at least one of carbon-black-based black nanoparticles, metal-oxide-based black nanoparticles, or organic-based black nanoparticles. TiNxOy or CuMnFeOx is used as the metal-oxide-based black nanoparticles, and lactam black or perylene black is used as the organic-based black nanoparticles.

Figure 5:
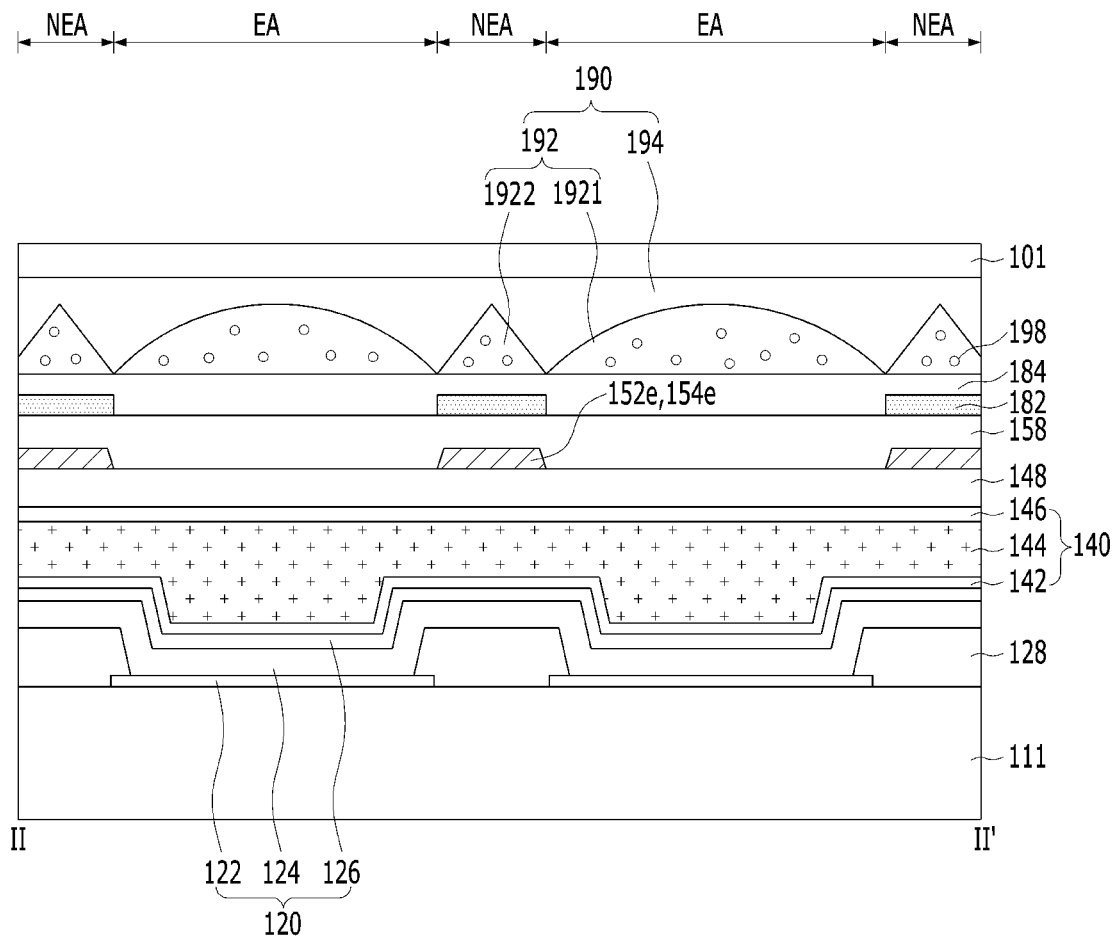
FIG. 5 is a sectional view of the organic light-emitting display device taken along line II-II' of FIG. 4 according to one embodiment of the present disclosure.

The element substrate 111, on which the light-emitting element 120, the encapsulation unit 140, and the touch sensor are sequentially stacked, is laminated with a cover substrate 101 via the optical adhesive layer 190 so as to face the cover substrate 101, as shown in FIG. 5.

The cover substrate 101 is made of a material, such as glass, a polymer, or a metal, depending on the direction in which light is emitted by the organic light-emitting display device. For example, in the case in which the organic light-emitting display device is of a rear light-emitting type, the cover substrate 101 is made of a material, such as an opaque metal. In the case in which the organic light-emitting display device is of a front light-emitting type, the cover substrate 101 is made of a material, such as a transparent polymer or glass. The cover substrate 101 is formed to have a smaller area than the element substrate 111, whereby the display pad 168 and the touch pads 160 formed on the element substrate 111 are exposed.

The optical adhesive layer 190 includes a lower adhesive layer 192 and an upper adhesive layer 194, which are sequentially stacked on the second touch passivation film 184.

The upper adhesive layer 194 is disposed between the cover substrate 101 and the lower adhesive layer 192, and is formed so as to have a higher refractive index than the lower adhesive layer 192. For example, the upper adhesive layer 194 is made of aliphatic acrylate having a refractive index of 1.6 or higher.

The lower adhesive layer 192 is disposed on the second touch passivation film 184. Meanwhile, since the second touch passivation film 184 may be omitted, the lower adhesive layer 192 may be disposed on the first touch passivation film 158, on which the antireflective film 182 is formed.

The lower adhesive layer 192 is formed to have a lower refractive index than the upper adhesive layer 194. For example, the lower adhesive layer 192 is formed to have a refractive index of 1.0 to less than 1.6. To this end, the lower adhesive layer 192 is formed to have a low-refractive particle 198, from which it is possible to obtain a scattering effect. A plurality of low-refractive particles 198 is dispersed in the lower adhesive layer 192. Each of the low-refractive particles 198 is made of hollow silica or metal fluoride.

Hollow silica is formed to have a core (air)-shell (silica) structure including air and silica that surrounds air. Since silica is formed so as to have a different refractive index from air, it is possible to obtain a scattering effect due to the difference in the refractive index between air and silica, whereby it is possible to improve the optical efficiency of the light-emitting element. Meanwhile, the content of air in hollow silica is 50% to 80%, and the refractive index is changed depending on the content of air. If the content of air is less than 50%, the refractive index is increased, whereby it is not possible to form the lower adhesive layer 192 such that the refractive index of the lower adhesive layer 192 is lower than the refractive index of the upper adhesive layer 194. If the content of air is greater than 80%, the thickness of the shell (silica) surrounding air is reduced, whereby the shell (silica) is easily damaged.

The content of hollow silica in the lower adhesive layer 192 is 25% to 50%, as shown in Table 1. If the content of hollow silica in the lower adhesive layer 192 is greater than 50%, transmittance is reduced, whereby it is not possible to improve optical efficiency. If the content of hollow silica is less than 25%, the refractive index is increased, whereby it is not possible to form the lower adhesive layer 192 such that the refractive index of the lower adhesive layer 192 is lower than the refractive index of the upper adhesive layer 194.

TABLE 1

| Content of silica | Refractive index | Transmittance |
|---|---|---|
| Air 50% | 1.37 | 92.50 |
| Air 80% | 1.33 | 91.68 |

Metal fluoride is formed of metal particles combined with fluorine, which has a dipole moment such that it has a low refractive index. For example, metal fluoride is formed of $MgF_2$ or NaF. As shown in Table 2, the content of metal fluoride in the lower adhesive layer 192 is 25% to 50%. If the content of metal fluoride is greater than 50%, transmittance is reduced, whereby it is not possible to improve optical efficiency. If the content of metal fluoride is less than 25%, the refractive index is increased, whereby it is not possible to form the lower adhesive layer 192 such that the refractive index of the lower adhesive layer 192 is lower than the refractive index of the upper adhesive layer 194.

TABLE 2

| Content | Refractive index | Transmittance |
|---|---|---|
| 25% | 1.38 | 96.54 |
| 50% | 1.36 | 94.23 |

Figure 6:
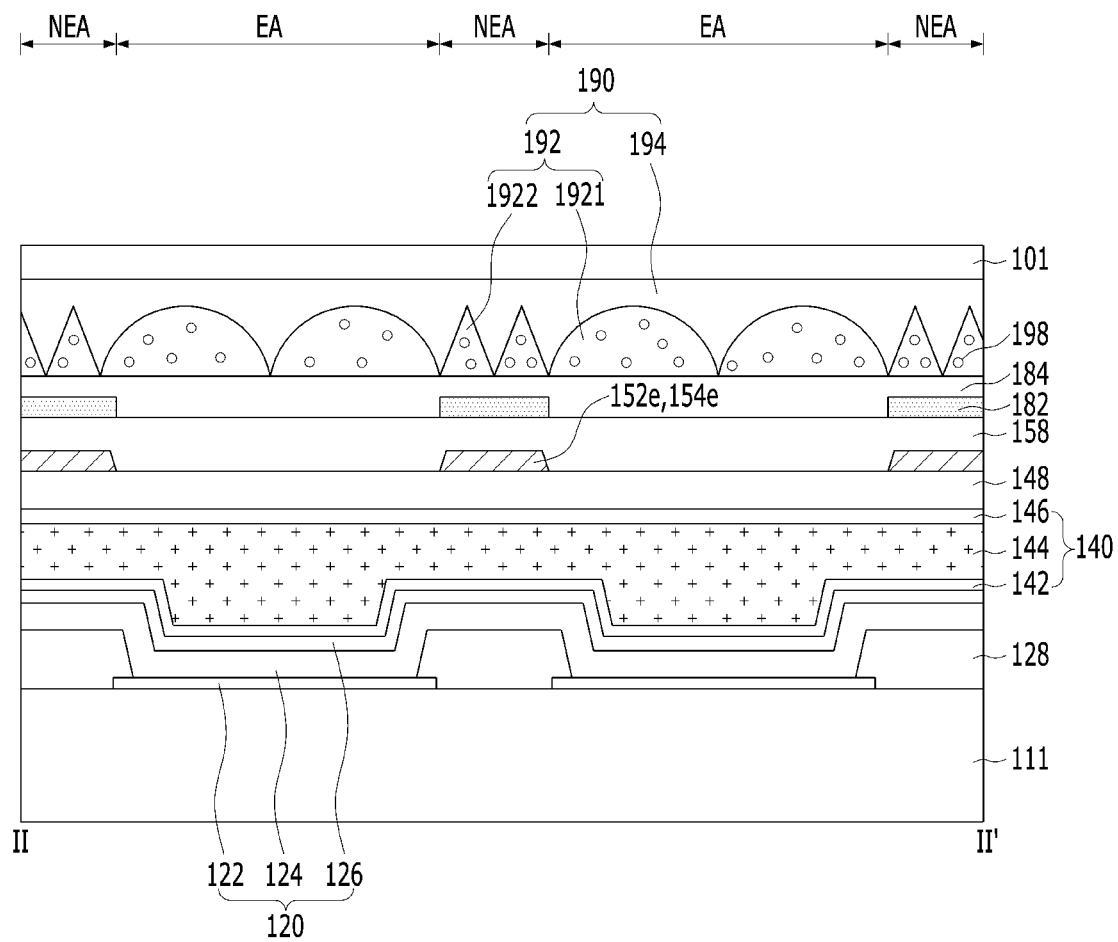
FIG. 6 is a sectional view showing another embodiment of the optical adhesive layer shown in FIG. 5 according to the present disclosure.

The lower adhesive layer 192 includes first lower adhesive layer 1921 and second lower adhesive layer 1922, which are formed to have different shapes. The first lower adhesive layer 1921 is formed in a semi-oval or semicircular shape having a curved surface in the emission area EA in which the first lower adhesive layer 1921 does not overlap the antireflective film 182. Since the surface area of the first lower adhesive layer 1921, which is formed in a semi-oval or semicircular shape, is larger than the surface area of the second lower adhesive layer 1922, the exit area of internal light emitted by the light-emitting stack 124 is increased. The first lower adhesive layer 1921 is formed to overlap each emission area EA in a one-to-one fashion, as shown in FIG. 5, or is formed so as to overlap each emission area EA in a one-to-many fashion, as shown in FIG. 6. The first lower adhesive layer 1921 is formed so as to overlap the emission area EA in a one-to-one fashion or in a one-to-many fashion within the range in which the curvature R of the first lower adhesive layer 1921 is maintained between 0.1 and 1.

The second lower adhesive layer 1922 is formed in a polygonal shape having an inclined surface in the non-emission area NEA, in which the second lower adhesive layer 1922 overlaps the antireflective film 182. For example, the second lower adhesive layer 1922 is formed in a triangular shape. The second lower adhesive layer 192 is formed so as to have the same height as the first lower adhesive layer 1921, or is formed so as to be higher than the first lower adhesive layer 1921. The antireflective film 182, the bank 128 and the second lower adhesive layer 1922 overlap each other.

The second lower adhesive layer 1922 is formed to overlap the non-emission area NEA, which is disposed between the respective emission areas EA, in a one-to-one fashion, as shown in FIG. 5, or is formed so as to overlap the non-emission area NEA, which is disposed between the respective emission areas EA, in a one-to-many fashion, as shown in FIG. 6. The second lower adhesive layer 1922 must be formed so as to overlap the non-emission area NEA in a one-to-one fashion or in a one-to-many fashion within the range in which the angle between the inclined surface and the lower surface of the second lower adhesive layer 1922 is maintained between 40 and 50 degrees in order to obtain an internal total reflection effect, by which external light is extinguished in the optical adhesive layer 190. In addition, the second lower adhesive layer 1922 and the upper adhesive layer 194 are also formed in a bezel area, in which a display signal link for connecting a display signal line, including the scan line SL and the data line DL, to the display pad and the routing line 170 for connecting the touch pad 160 to the touch sensor are disposed.

The optical adhesive layer 190, which includes the upper adhesive layer 194 and the lower adhesive layer 192, is manufactured as follows. One of the upper adhesive layer 194 and the lower adhesive layer 192 is formed through a patterning process including a photolithography process or an imprinting process, and the other of the upper adhesive layer 194 and the lower adhesive layer 192 is formed through a printing process.

For example, a dielectric material is applied to the cover substrate 101 and is patterned into the reverse shape of the lower adhesive layer 192, whereby the upper adhesive layer 194 is formed. The lower adhesive layer 192 is formed between the cover substrate 101, on which the upper adhesive layer 194 is formed, and the element substrate 111, on which the second touch passivation film 184 is formed, by filling.

In addition, a dielectric material is applied to the second touch passivation film 184 and is patterned into the reverse shape of the upper adhesive layer 194, whereby the lower adhesive layer 192 is formed. The upper adhesive layer 194 is formed between the element substrate 111, on which the lower adhesive layer 192 is formed, and the cover substrate 101 by filling.

A process of reducing the reflection of external light using the optical adhesive layer 190 according to the present invention and a process of improving the optical efficiency will be described with reference to FIG. 7.

Figure 7:
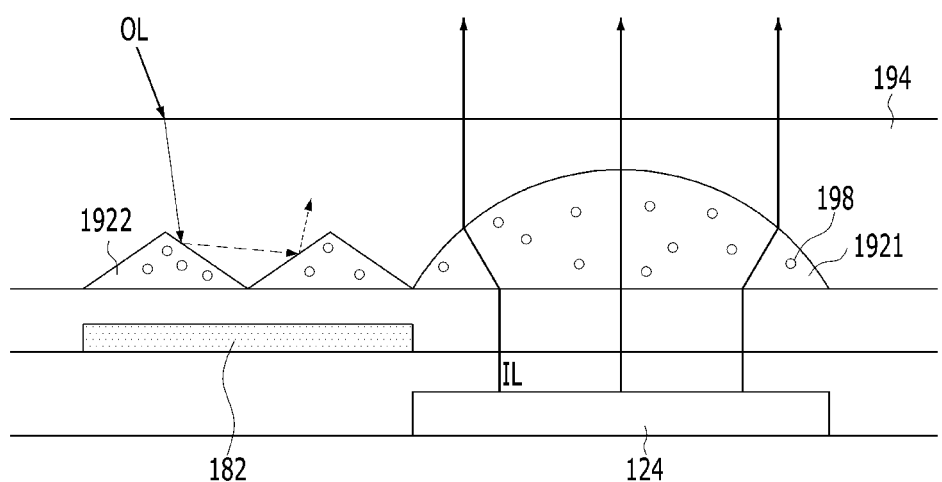
FIG. 7 is a view illustrating a process of reducing the reflection of external light using the optical adhesive layer according to one embodiment of the present disclosure and a process of improving the optical efficiency of internal light.

As shown in FIG. 7, internal light IL emitted by the light-emitting stack 124 is refracted from the interface between the first lower adhesive layer 1921 and the upper adhesive layer 194, which have different refractive indices, to the front surface thereof, at which the eye of a user is located, and then exits. As a result, the internal light IL emitted by the light-emitting stack 124 is condensed to the emission area EA without moving to the non-emission area NEA, whereby it is possible to improve optical efficiency.

In addition, external light OL incident on the lower adhesive layer 192, which has a low refractive index, from the upper adhesive layer 194, which has a high refractive index, is not discharged to the outside but is absorbed and extinguished in the optical adhesive layer 190 due to an internal total reflection phenomenon when the incident angle of the external light is greater than the total reflection critical angle. The angle between the inclined surface and the lower surface of the second lower adhesive layer 1922 is formed so as to be 40 to 50 degrees in order to improve internal total reflection efficiency. In the present disclosure, as described above, the external light is absorbed using the antireflective film 182, and the external light is extinguished through internal total reflection using the optical adhesive layer 190, which includes the lower adhesive layer 192 and the upper adhesive layer 194, whereby it is possible to prevent the reflection of external light. As shown in Table 3, the reflectance of external light is 6.8% according to Comparative Example, in which an adhesive layer including only an optical clear adhesive (OCA) is used, whereas the reflectance of external light is 5.0% according to Example, in which the optical adhesive layer 190, which includes the lower adhesive layer 192 and the upper adhesive layer 194, is used. Consequently, it can be seen that the reflectance of external light according to Example is lower than the reflectance of external light according to Comparative Example.

TABLE 3

|  | Comparative Example | Example |
| --- | --- | --- |
| Reflectance | 6.8% | 5.0% |

In the present disclosure, as described above, it is possible to condense internal light generated by the light-emitting element 120 to the emission area EA using the optical adhesive layer 190, which includes the lower adhesive layer 192 and the upper adhesive layer 194, whereby it is possible to improve optical efficiency. Also, in the present disclosure, it is possible to reduce external light from being incident on the touch sensor and the routing line 170 using the optical adhesive layer 190, which includes the lower adhesive layer 192 and the upper adhesive layer 194. In the present invention, therefore, it is possible to prevent a reduction in external visibility, and therefore it is possible to remove a polarizing film, a semi-transmissive film, or an OLED transmittance controllable film (OTF), which is expensive. In the present disclosure, as described above, an expensive optical film is removed, and therefore it is possible to improve transmittance and luminance. Consequently, the power consumption thereof is reduced, and the lifespan thereof is increased. In addition, it is possible to simplify processing and to reduce costs.

As is apparent from the above description, in the present disclosure, it is possible to reduce external light from being incident on the touch sensor and the routing line using the optical adhesive layer, which includes the lower adhesive layer and the upper adhesive layer, and the antireflective film. In the present disclosure, therefore, it is possible to reduce a reduction in external visibility, and therefore it is possible to remove a polarizing film, a semi-transmissive film, or an OLED transmittance controllable film, which is expensive. Also, in the present disclosure, it is possible to improve the transmittance and luminance of the display device, since such an expensive optical film is removed, as described above. Consequently, the power consumption thereof is reduced, and the lifespan thereof is increased. In addition, it is possible to simplify processing and to reduce costs.

Also, in the present invention, it is possible to condense internal light generated by the light-emitting element to the emission area using the optical adhesive layer, which includes the lower adhesive layer and the upper adhesive layer, whereby it is possible to improve optical efficiency.

It will be apparent to those skilled in the art that various modifications and variations can be made in the present invention without departing from the spirit or scope of the invention. Thus, it is intended that the present invention covers such modifications and variations to this invention provided they come within the scope of the appended claims and their equivalents.

What is claimed is:

1. A display device having an active area and a non-active area, the display device comprising: an element substrate including a plurality of emission areas and a non-emmission area disposed between the plurality of emission areas; a bank disposed on the element substrate, the bank overlapping the non-emission area, a light-emitting element disposed in an emission area of the plurality of emission areas of the element substrate, the light-emitting element including an anode electrode, at least one light-emitting stack and a cathode electrode; an encapsulation unit disposed on a top surface of the light-emitting element; a touch sensor disposed on a top surface of the encapsulation unit; a routing line disposed along a side surface of the encapsulation unit; and an optical adhesive layer disposed on a top surface of the touch sensor, wherein the optical adhesive layer comprises a lower adhesive layer disposed on the top surface of the touch sensor and an upper adhesive layer disposed on a top surface of the lower adhesive layer, wherein the lower adhesive layer comprises: a first lower adhesive layer including a curved surface, and overlapping the emission area; and a second lower adhesive layer disposed in a same layer as the first lower adhesive layer, the second lower adhesive layer including an inclined surface and overlapping the non-emission area, wherein the first lower adhesive layer and the second lower adhesive layer have different shapes and are disposed between the touch sensor and the upper adhesive layer, wherein the lower adhesive layer, disposed between the touch sensor and the upper adhesive layer, has a lower refractive index than the upper adhesive layer, wherein the inclined surface of the second lower adhesive layer overlaps the bank, and wherein the curved surface of the first lower adhesive layer overlaps the anode electrode.

2. The display device according to claim 1, further comprising a cover substrate disposed to face the element substrate.

3. The display device according to claim 1, further comprising a touch buffer layer disposed between the encapsulation unit and the touch sensor.

4. The display device according to claim 3, wherein the encapsulation unit, the optical adhesive layer, and the touch buffer layer extend from the active area to the non-active area.

5. The display device according to claim 3, further comprising:
a pad contact hole formed through the touch buffer layer.

6. The display device according to claim 5, wherein the encapsulation unit comprises at least one inorganic encapsulation layer and at least one organic encapsulation layer, and
an edge portion of the touch buffer layer is closer to the pad contact hole than an edge portion of the inorganic encapsulation layer.

7. The display device according to claim 6, further comprising:
a dam disposed on the element substrate,
wherein the inorganic encapsulation layer, the touch buffer layer, the routing line and the optical adhesive layer are disposed on the dam.

8. The display device according to claim 1, further comprising:
a first touch passivation film and a second touch passivation film disposed on the touch sensor, wherein each of the first touch passivation film and the second touch passivation film is made of an organic material.

9. The display device according to claim 1, wherein
the first lower adhesive layer comprises a semicircular shape or a hemispherical shape, and
the second lower adhesive layer comprises a polygonal shape.

10. The display device according to claim 1, wherein the lower adhesive layer comprises a low-refractive particle having a lower refractive index than the upper adhesive layer.

11. The display device according to claim 10, wherein the low-refractive particle is made of hollow silica or metal fluoride.

12. The display device according to claim 1, further comprising
an antireflective film disposed between the lower adhesive layer and the touch sensor, wherein the antireflective film, the bank, and the second lower adhesive layer overlap each other.

13. The display device according to claim 12, wherein the antireflective film is formed by black material.

14. The display device according to claim 1, wherein the touch sensor comprises a touch electrode made of a mesh metal film in a mesh shape, and
the second lower adhesive layer overlaps the mesh metal film.

15. The display device according to claim 1, wherein
the routing line is connected to the touch sensor, and
the routing line overlaps the second lower adhesive layer.

* * * * *